US012737611B2

(12) United States Patent
Asselin et al.

(10) Patent No.: US 12,737,611 B2
(45) Date of Patent: Sep. 15, 2026

(54) CLASSIFYING ELEMENTS AND PREDICTING PROPERTIES IN AN INFRASTRUCTURE MODEL THROUGH PROTOTYPE NETWORKS AND WEAKLY SUPERVISED LEARNING

(71) Applicant: Bentley Systems, Incorporated, Exton, PA (US)

(72) Inventors: Louis-Philippe Asselin, Quebec City (CA); Marc-André Lapointe, Quebec City (CA); Karl-Alexandre Jahjah, Quebec City (CA); Evan Rausch-Larouche, Quebec City (CA)

(73) Assignee: Bentley Systems, Incorporated, Exton, PA (US)

( * ) Notice: Subject to any disclaimer, the term of this patent is extended or adjusted under 35 U.S.C. 154(b) by 906 days.

(21) Appl. No.: 17/314,735

(22) Filed: May 7, 2021

(65) Prior Publication Data

US 2022/0358360 A1 Nov. 10, 2022

(51) Int. Cl.
*G06N 3/08* (2023.01)
*G06N 3/04* (2023.01)

(52) U.S. Cl.
CPC ................. *G06N 3/08* (2013.01); *G06N 3/04* (2013.01)

(58) Field of Classification Search
CPC ........... G06N 3/08; G06N 3/045; G06N 3/084
See application file for complete search history.

(56) References Cited

U.S. PATENT DOCUMENTS

| | | | | |
|---|---|---|---|---|
| 8,744,125 | B2 * | 6/2014 | Zhu | G06V 10/75 382/103 |
| 11,151,386 | B1 * | 10/2021 | Aggarwal | H04N 21/84 |
| 2002/0091655 | A1 * | 7/2002 | Agrafiotis | G06F 18/213 706/26 |
| 2003/0147558 | A1 * | 8/2003 | Loui | G06F 18/254 382/228 |
| 2020/0082224 | A1 * | 3/2020 | Sikka | G06V 10/82 |
| 2021/0073441 | A1 * | 3/2021 | Austern | G06F 30/12 |
| 2021/0089924 | A1 * | 3/2021 | Kruus | G06N 3/0455 |
| 2021/0117716 | A1 | 4/2021 | Lapointe et al. | |
| 2021/0295091 | A1 * | 9/2021 | Li | G06V 10/7753 |
| 2022/0215289 | A1 * | 7/2022 | Mopur | G06N 20/00 |

FOREIGN PATENT DOCUMENTS

WO WO-2018093935 A1 * 5/2018 ............. G06N 3/084

OTHER PUBLICATIONS

Pahde, Frederik, et al. "Multimodal Prototypical Networks for Few-Shot Learning." 2021 IEEE Winter Conference on Applications of Computer Vision (WACV), IEEE, 2021. Crossref, https://doi.org/10.1109/wacv48630.2021.00269. (Year: 2020).*

Austern et al (U.S. Pat. No. 20210073441 A1, hereinafter Austern), in view of Sikka et al.(U.S. Pat. No. 20200082224 A1, hereinafter Sikka), in view of Agrafiotis et al. (U.S. Pat. No. 20020091655 A1, hereinafter Agrafiotis), in view of Pahde et al.(Pahde, Frederik, et al. "Multimodal Prototypical Networks for Few-Shot Learning." (Year: 2021).*

Pahde, Frederik, et al. "Multimodal Prototypical Networks for Few-Shot Learning." 2021 IEEE Winter Conference on Applications of Computer Vision (WACV), IEEE, 2021. Crossref, https://doi.org/10.1109/wacv48630.2021.00269. (Year: 2021).*

Dabbura, Imad. "K Means Clustering: Algorithm, Applications, Evaluation Methods, and Drawbacks." Medium, Sep. 17, 2018. https://towardsdatascience.com/k-means-clustering-algorithm-applications-evaluation-methods-and-drawbacks-aa03e644b48a. (Year: 2018).*

Belsky, Michael, et al., "Semantic Enrichment for Building Information Modeling," Cib, Computer-Aided Civil and Infrastructure Engineering, vol. 31, Issue 4, Apr. 2016, pp. 1-14.

Ma, Ling, et al., "3D Object Classification Using Geometric Features and Pairwise Relationships," Computer-Aided Civil and Infrastructure Engineering, vol. 33, Issue 2, Feb. 2018, pp. 1-13.

Sacks, Rafael, et al., "Semantic Enrichment for Building Information Modeling: Procedure for Compiling Inference Rules and Operators for Complex Geometry," ASCE, Journal of Computing in Civil Engineering, vol. 31, No. 6, Aug. 28, 2017, pp. 1-12.

Snell, Jake, et al., "Prototypical Networks for Few-shot Learning," 31st Conference on Neural Information Processing Systems (NIPS 2017), Long Beach, CA, USA, Mar. 2017, pp. 1-11.

U.S. Appl. No. 17/075,412, filed Oct. 20, 2020 by Karl-Alexandre Jahjah, et al. for Automatic Identification of Misclassified Elements of an Infrastructure Model, pp. 1-46.

U.S. Appl. No. 17/128,912, filed Dec. 21, 2020 by Karl-Alexandre Jahjah, et al. for Techniques for Labeling, Reviewing and Correcting Label Predictions for P&IDS, pp. 1-44.

U.S. Appl. No. 17/129,205, filed Dec. 21, 2020 by Marc-André Gardner, et al. for Techniques for Extracting Machine-Readable Information From P&IDS, pp. 1-29.

Wu, Jin, et al., "New Automated BIM Object Classification Method to Support BIM Interoperability," ASCE, Journal of Computing in Civil Engineering, vol. 33, No. 5, Sep. 2019, pp. 1-56.

(Continued)

*Primary Examiner* — Omar F Fernandez Rivas
*Assistant Examiner* — Corey M Sackalosky
(74) *Attorney, Agent, or Firm* — Cesari and McKenna, LLP

(57) ABSTRACT

In example embodiments, a software service may employ a neural network to learn a non-linear mapping that transforms element features into embeddings. The neural network may be trained to distribute the embeddings in multi-dimensional embedding space, such that distance between the embeddings is meaningful to the class or category classification, or property prediction, task at hand. The neural network may be trained using weakly supervised machine learning, using weakly labeled infrastructure models. Embeddings for groups may be used to determine prototypes. Elements of an infrastructure model may be classified into classes or categories, or their properties predicted, as the case may be, by finding a nearest prototype.

17 Claims, 12 Drawing Sheets

(56) References Cited

OTHER PUBLICATIONS

Zienkiewicz, O.C., R.L. Taylor, and J.Z. Zhu, "'Standard' and 'Hierarchical' Element Shape Functions: Sone General Families of Co Continuity," Chapter 8, The Finite Element Method: Its Basis and Fundamentals, Sixth edition, Elsevier Butterworth-Heinemann, Sixth edition, 2005, pp. 164-199.

Boney, Rinu, et al, "Semi-Supervised and Active Few-Shot Learning with Prototypical Networks," Arxiv.org, Cornell University Library, 201 Olin Library Cornell University Ithaca, NY 14853, Nov. 29, 2017, pp. 1-11.

"Notification of Transmittal of the International Search Report and the Written Opinion of the International Searching Authority, or the Declaration," International Filing Date: Nov. 30, 2021, International Application No. PCT/US2021/061144, Applicant: Bentley Systems, Incorporated, Date of Mailing: Apr. 4, 2022, pp. 1-18.

Pahde, Frederik, et al., "Multimodal Prototypical Networks for Few-shot Learning," Arxiv.org, Cornell University Library, 201 Olin Library Cornell University Ithaca, NY 14853, Nov. 17, 2020, pp. 1-14.

Snell, Jake, et al., "Prototypical Networks for Few-shot Learning," Advances in Neural Information Processing Systems 30: 31st Annual Conference on Neural Information Processing Systems (NIPS 2017), Long Beach, California, USA, Dec. 4-9, 2017, vol. 6, Dec. 31, 2017, pp. 4078-4088.

* cited by examiner

CLASSIFYING ELEMENTS AND PREDICTING PROPERTIES IN AN INFRASTRUCTURE MODEL THROUGH PROTOTYPE NETWORKS AND WEAKLY SUPERVISED LEARNING

BACKGROUND

Technical Field

The present disclosure relates generally to infrastructure modeling, and more specifically to improved techniques for classifying elements into classes or categories, or predicting properties of elements in an infrastructure model.

Background Information

In the design, construction and/or operation of infrastructure (e.g., buildings, factories, roads, railways, bridges, electrical and communication networks, equipment, etc.) it is often desirable to create infrastructure models. An infrastructure model may maintain a built infrastructure model (BIM) or digital twin of infrastructure. A BIM is a digital representation of infrastructure as it should be built, providing a mechanism for visualization and collaboration. A digital twin is a digital representation of infrastructure as it is actually built, and is often synchronized with information representing current status, working conditions, position or other qualities.

It is often necessary to classify individual elements of an infrastructure model (e.g., maintaining a BIM or digital twin) as belonging to a particular class or category in order to execute analytical tools on the model, for example, analytical tools that measure and provide dashboards for monitoring project performance (e.g., schedule, cost, and safety compliance) and the impact of design changes. The class or category of an element may indicate the element is part of a group in a hierarchical arrangement of elements. Examples of classes and categories include beams, walls, columns, braces, windows, doors, pipes, etc. Such classes and categories may include sub-classes and sub-categories (e.g., for different types beams, walls, columns, braces, windows, doors, pipes, etc.). Classes and categories allow similar elements to be analyzed together. Without the ability to accurately classify elements into classes and categories, running analytics is often extremely difficult.

Similarly, it also is often necessary to predict properties of elements of an infrastructure model (e.g., maintaining a BIM or digital twin) in order to execute analytical tools on the model. The properties of an element may indicate materials (e.g., wood, concrete, steel, etc.), numerical qualities (e.g., diameter, length, thickness, etc.) or other aspects of the element. Properties, like the hierarchical groups imposed by classes and categories, allow similar elements to be analyzed together. Without the ability to accurately predict properties of elements, running analytics is again extremely difficult.

Infrastructure models (e.g., maintaining BIMs or digital twins) may be constructed by federating data from distributed sources. These data sources may include different amounts of class, category and property information that utilize various different types of nomenclature. It is often impractical to establish standards for nomenclature so it is all coherent at the source. Even if standards are established, if consistency is not rigorously monitored, an organization or vendor may introduce a non-compliant data source. Further, even if there is diligent standards enforcement, sometimes errors will still occur in the data. For example, due to human error an element may be misclassified, such that it is associated with the wrong class or category, or associated with an incorrect property value.

Accordingly, it is often necessary to classify elements into classes and categories and predict properties once the elements are federated into an infrastructure model, to correct misclassification and fill in missing information. This may be done in a number of different ways. Some techniques are largely manual. For example, users may manually add or update class, category and property information. However, infrastructure models may include huge numbers of elements. In addition to being extremely time consuming, manual classification may be error prone.

Other techniques are largely automated. For example, machine learning may be used. A classification model may be trained to classify elements into classes and categories, and predict properties. However, existing machine learning techniques have shortcomings. Typically, such techniques have relied upon supervised learning via labeled datasets (i.e. datasets where the correctness of each class, category or property is known and indicated). If the classification model is to predict misclassifications or incorrect properties, the training datasets need to include labeled examples of misclassifications or incorrect properties. Typically, though, it is difficult to obtain large numbers of labeled examples of misclassifications or incorrect properties. In actual infrastructure models, elements with misclassifications or incorrect properties typically represent only a tiny fraction of all elements, as such models may have been curated multiple times. Techniques may be used to artificially generate misclassifications or incorrect properties. For example, one could randomly swap the class, category or property of two different element to create an error. However, artificially generated datasets may not well represent the types of errors that naturally occur in infrastructure models, and therefore may be limited in how well they can train classification models.

Accordingly, there is a need for techniques to address the problem of classifying elements into classes or categories, or predicting properties of elements in an infrastructure model.

SUMMARY

In example embodiments, techniques are provided to classify elements into classes or categories, or predict properties of elements, in an infrastructure model using a prototype network (alternatively referred to as a “prototypical” network) and weakly supervised learning. A software service may employ a neural network to learn a non-linear mapping that transforms element features into embeddings. The neural network may be trained to distribute the embeddings in multi-dimensional embedding space, such that distance between the embeddings is meaningful to the class or category classification, or property prediction, task at hand. The neural network may be trained using weakly supervised machine learning, using weakly labeled infrastructure models. Embeddings for groups may be used to determine prototypes. A prototype may be simply the mean for a group or a subset of a group, or a probabilistic distribution (e.g. a multivariant gaussian distribution) for a group or a subset of the group. Elements of an infrastructure model may be classified into classes or categories, or their properties predicted, as the case may be, by finding a nearest prototype. For each element, a probability of belonging to a group corresponding to each prototype may be computed. The class, category or property of the group with the highest probability may be assigned to the element. If an existing classification already exists, the probability of that class, category or property may be compared with the highest probability to determine if the element is misclassified.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Figure 1:
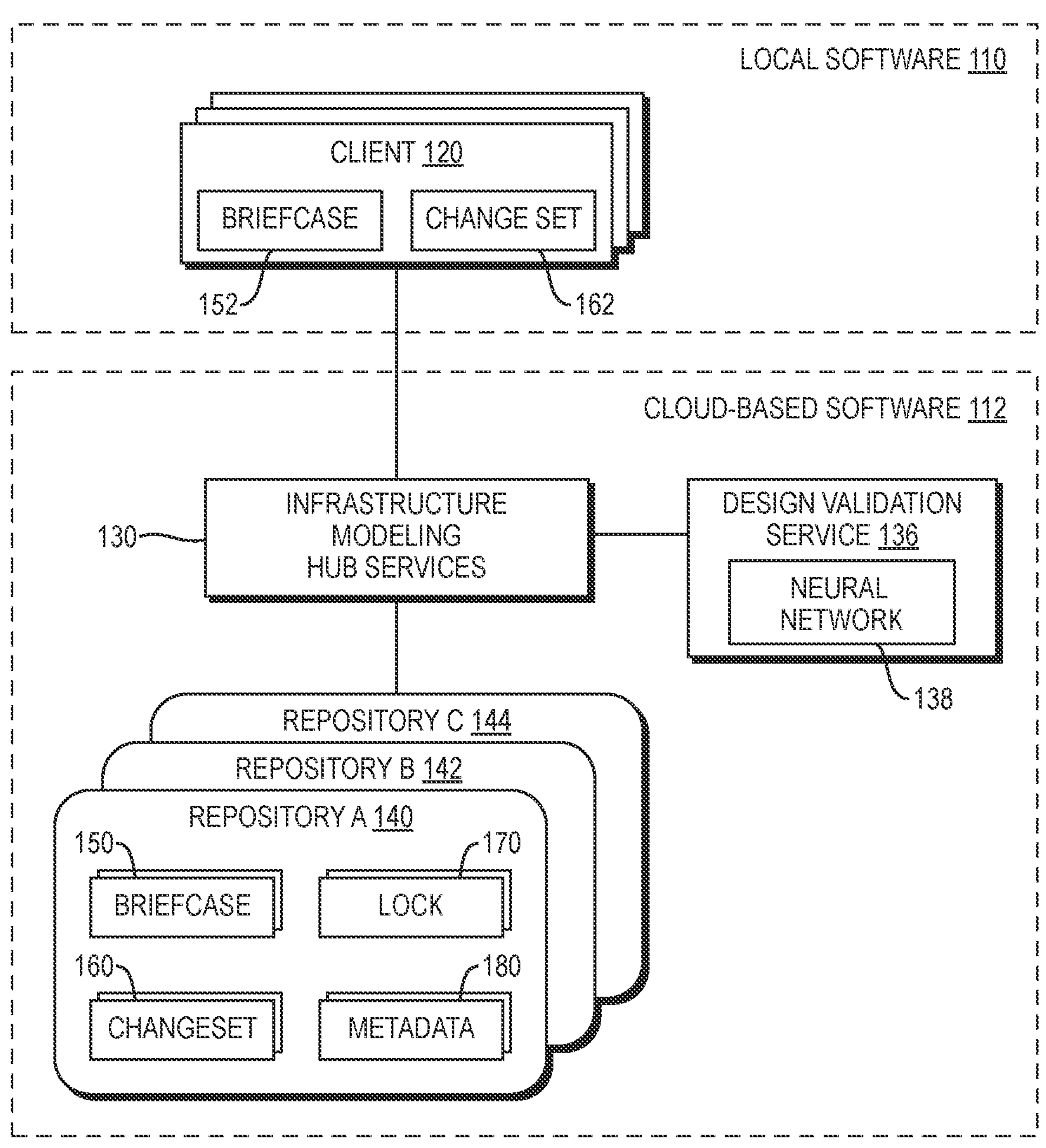
FIG. 1 is a high-level block diagram of at least a portion of an example software architecture that may implement the techniques described herein.

FIG. 1 is a high-level block diagram of at least a portion of an example software architecture that may implement the techniques described herein. The architecture may be divided into client-side software 110 executing on one or more computing devices arranged locally (collectively "client devices"), and cloud-based services software 112 executing on one or more remote computing devices ("cloud computing devices") accessible over the Internet. Each computing device may include processors, memory/storage, a display screen, and other hardware (not shown) for executing software, storing data and/or displaying information. The client-side software 110 may include client software applications (or simply "clients") 120 operated by users. The clients 120 may be of various types, including desktop clients that operate directly under an operating system of a client device and web-based client applications that operate within a web browser. The clients 120 may be concerned mainly with providing user interfaces that allow users to create, modify, display and/or otherwise interact with infrastructure models. As used herein, the term "infrastructure model" refers to a structure that maintains a digital twin, built infrastructure model (BIM) or other representation of infrastructure. One specific type of infrastructure model may be the iModel® infrastructure model. As used herein, the term "infrastructure" refers to a physical structure or object that has been built, or is planned to be built, in the real-world. Examples of infrastructure include buildings, factories, roads, railways, bridges, electrical and communication networks, equipment, etc.

The cloud-based software 112 may include infrastructure modeling hub services (e.g., iModelHub™ services) 130 and other services software that manage repositories 140-144 that maintain the infrastructure models. The clients 120 and the infrastructure modeling hub services 130 may utilize a built infrastructure schema (BIS) that describes semantics of data representing infrastructure, using high-level data structures and concepts. The BIS may utilize (be layered upon) an underlying database system (e.g., SQLite) that handles primitive database operations, such as inserts, updates and deletes of rows of tables of underlying distributed databases (e.g., SQL databases). The database system may utilize an underlying database schema (e.g., a DgnDb schema) that describes the actual rows and columns of the tables.

In more detail, the conceptual schema (e.g., BIS), may describe infrastructure using elements, models, and relationships, which serve as building blocks of an infrastructure model. Physical information may serve as a "backbone," and non-physical information (e.g., analytical information, functional information, etc.) may be maintained relative to (e.g., augmenting) the "backbone." Elements represent (i.e. "model", in a colloquial sense of the term) individual entities. One element may be the "lead" element, based on the nature of the entity being modeled. Other elements typically relate back the lead element. A model acts as a container for a set of elements, where the set of elements collectively represent (i.e. "model", in a colloquial sense of the term) an entity. In some cases, models may nest. That is, a model is said to "break down" a particular element into a finer-grained description. Models may be arranged according to a model hierarchy to support modeling from multiple perspectives. A single repository model may serve as a root of the model hierarchy. Relationships relate two or more elements or models. Examples of relationships include parent-child relationships that may imply ownership and peer-peer relationships that may define groups.

Likewise, the underlying database schema (e.g., a DgnDb schema) may describe how the objects are stored to individual rows of tables of the underlying databases. Elements, models and relationships may be maintained using rows of tables, which store related metadata. The structure of the row and tables themselves may also convey metadata. The metadata may include geometric information (shape, volume, surface area, length, length over height ratio, position, dimension etc.), textual information (e.g., user label, class, category, etc.), contextual features (e.g., relative location), temporal information (e.g., time an element was added) or other types of information. To create, remove or modify an object, primitive database operations such as inserts, deletes or updates are performed by the underlying database system upon the appropriate rows of the appropriate tables.

To enable multiple versions and concurrent operation, briefcases and changesets may be utilized by clients 120 and infrastructure modeling hub services 130. A briefcase is a particular instance of a database, that when used as a constituent database of a repository 140-144, represents a materialized view of the information of a specific version of the repository. Initially an "empty" baseline briefcase may be programmatically created. Over time the baseline briefcase may be modified with changesets, which are persistent electronic records that capture changes needed to transform a particular instance from one version to a new version. A changeset often includes original values (pre-change) values of selected properties of objects as well as the new (changed) values of those selected properties.

Infrastructure modeling hub services 130 may maintain briefcases 150 and a set of accepted changesets 160 (i.e. changesets that have been successfully pushed) in a repository 140-144. The infrastructure modeling hub services 130 may also maintain locks 170 and associated changeset metadata 180 in the repository 140-144. When a client 120 desires to operate upon an infrastructure model, it may obtain the briefcase 150 from a repository 140-144 closest to the desired state and those accepted changesets 160 from the repository 140-144 that when applied bring that briefcase up to the desired state. To avoid the need to constantly access the repository 140-144, clients may maintain a local copy 152 (a local instance of the database).

When a client 120 desires to make changes to the infrastructure model, it may use the database system to preform primitive database operations, such as inserts, updates and deletes, on rows of tables of its local copy. The client 120 records these primitive database operations and eventually bundles them to create a local changeset 162. At this stage, the local changeset 162 represents pending changes to the infrastructure model, that are reflected locally on the client 120, but that have not yet been accepted to be shared with other clients. Subsequently, the client 120 may push the local changeset 162 back to infrastructure model hub services 130 to be added to the set of accepted changesets 160 in a repository 140-144.

The infrastructure modeling hub services (e.g., iModelHub™ services) 130 may interact with a number of other services in the cloud, that perform information management and support functions. For example, information management services (not shown) may manage asset data, project data, reality data, Internet of Things (IoT) data, codes, and other features. One such service may be a design validation service 136 that evaluates the impact of design changes on performance of the infrastructure model, including project schedule, cost, and safety compliance. The design validation service 136 may be capable of automatically classifying elements of an infrastructure model into classes and categories and predicting properties, to correct misclassification and fill in missing information, among other purposes. A wide variety of additional services (not shown) may also be provided that interact with infrastructure modeling hub services (e.g., iModelHub™ services) 130.

The design validation service 136 may utilize a prototype network trained using weakly supervised learning to enable such classification and property prediction. In general, prototype networks are based on the concept that there exists a multi-dimensional numerical representation (an "embedding") that will cause data points to cluster around a single representation of a group (a "prototype") in multi-dimensional embedding space for each of a number of classification classes. In order to do this, a system may learn a non-linear mapping of the input into an output in the embedding space. The resulting set in the embedding space is then used to determine a prototype. Classifications may be performed for an embedded query point by finding the nearest prototype.

Applying this concept to classifying elements of an infrastructure model, the design validation service 136 may employ a neural network 138 to learn a non-linear mapping that transforms element features into embeddings. The neural network 138 may be trained to distribute the embeddings in multi-dimensional embedding space, such that distance between the embeddings is meaningful to the class or category classification, or property prediction, task at hand. The neural network may be trained using weakly supervised machine learning, using weakly labeled infrastructure models. Embeddings for groups may be used to determine prototypes. A prototype may be simply the mean for a group or a subset of a group, or a probabilistic distribution (e.g., a multivariate normal distribution) for a group or a subset of the group. Elements of an infrastructure model may be classified into classes or categories, or their properties predicted, as the case may be, by finding a nearest prototype. For numerical properties, a regression model can be trained on top of the embedding or interpolation can be performed between prototypes. For each element, a probability of belonging to a group corresponding to each prototype may be computed. The class, category or property of the group with the highest probability may be assigned to the element.

Figure 2:
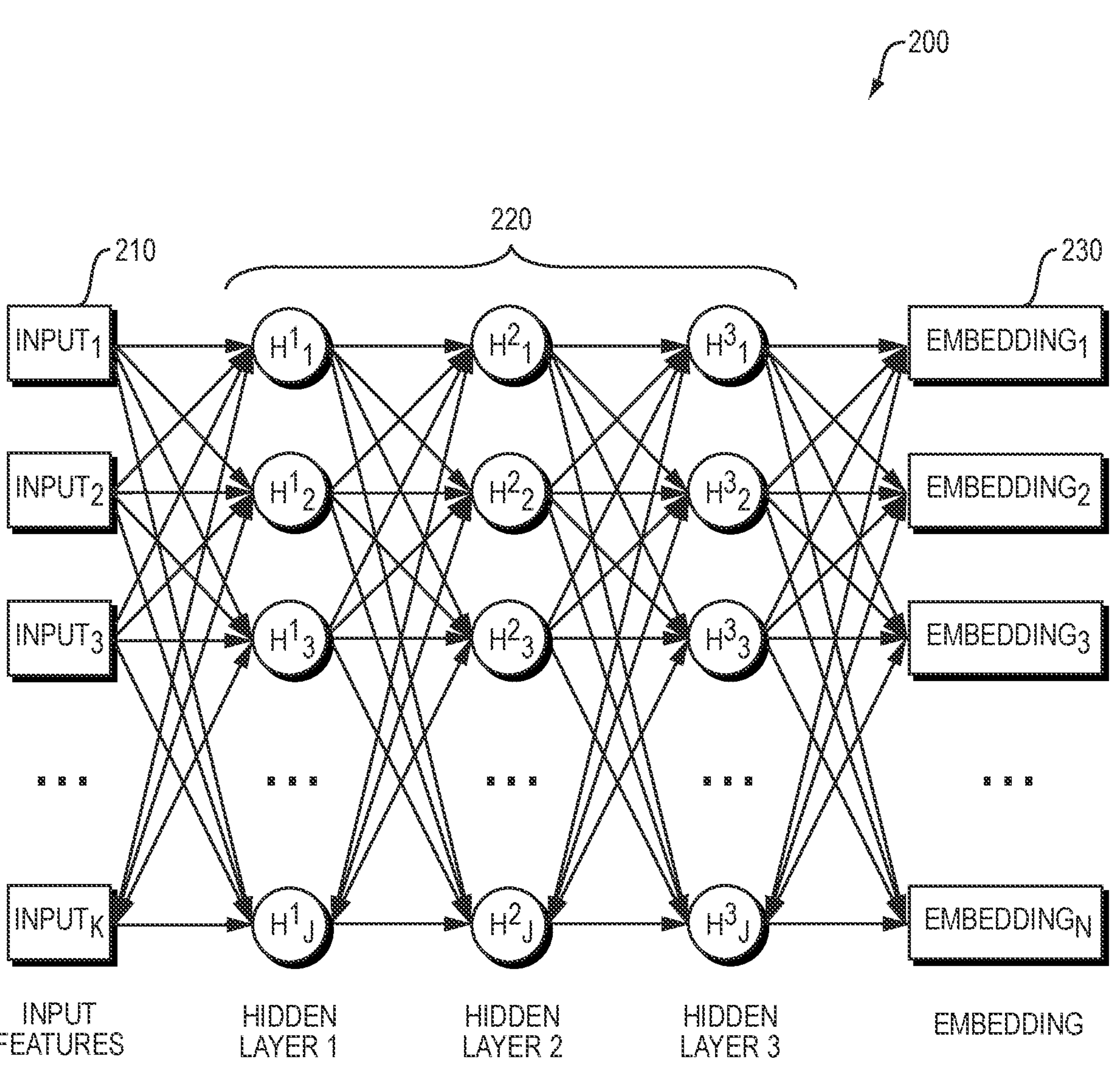
FIG. 2 is a diagram of an example neural network (an "embedding network") that may be trained using weakly supervised machine learning to distribute embeddings in multi-dimensional embedding space.

FIG. 2 is a diagram of an example neural network (an "embedding network") 200 that may be trained using weakly supervised machine learning to distribute embeddings in multi-dimensional embedding space. The neural network may take any of a variety of different forms. In one implementation, the neural network 200 is a multilayer perceptron (MLP) network that includes an input layer 210, one or more hidden layers 220 and an output layer 230, each having a number of nodes. MLP layers may be fully connected, such that each node in one layer connects to every node in the following layer. Except for the input layer nodes, each node may be a neuron that uses a nonlinear activation function (e.g., a rectified linear activation function (ReLU)) that maps weighted inputs to an output. The input layer 210 may receive a k-dimensional set of features of elements. The features may be numeric vectors derived from the metadata of elements (e.g., by a feature encoding), and may include geometric features (shape, volume, surface area, length, length over height ratio, position, dimension etc.), textual or contextual features (e.g., user label, class, category, relative location etc.), and temporal features (e.g., time the element was added), among others. The output layer may provide a n-dimensional numerical representation (an "embedding") for the input element. For an infrastructure model having multiple elements, each individual element may be passed through the neural network 200 and its embedding obtained, with a goal of the neural network being to distribute the embeddings in n-dimensional space in a way that is meaningful to the class or category classification, or property prediction, task at hand.

Figure 3:
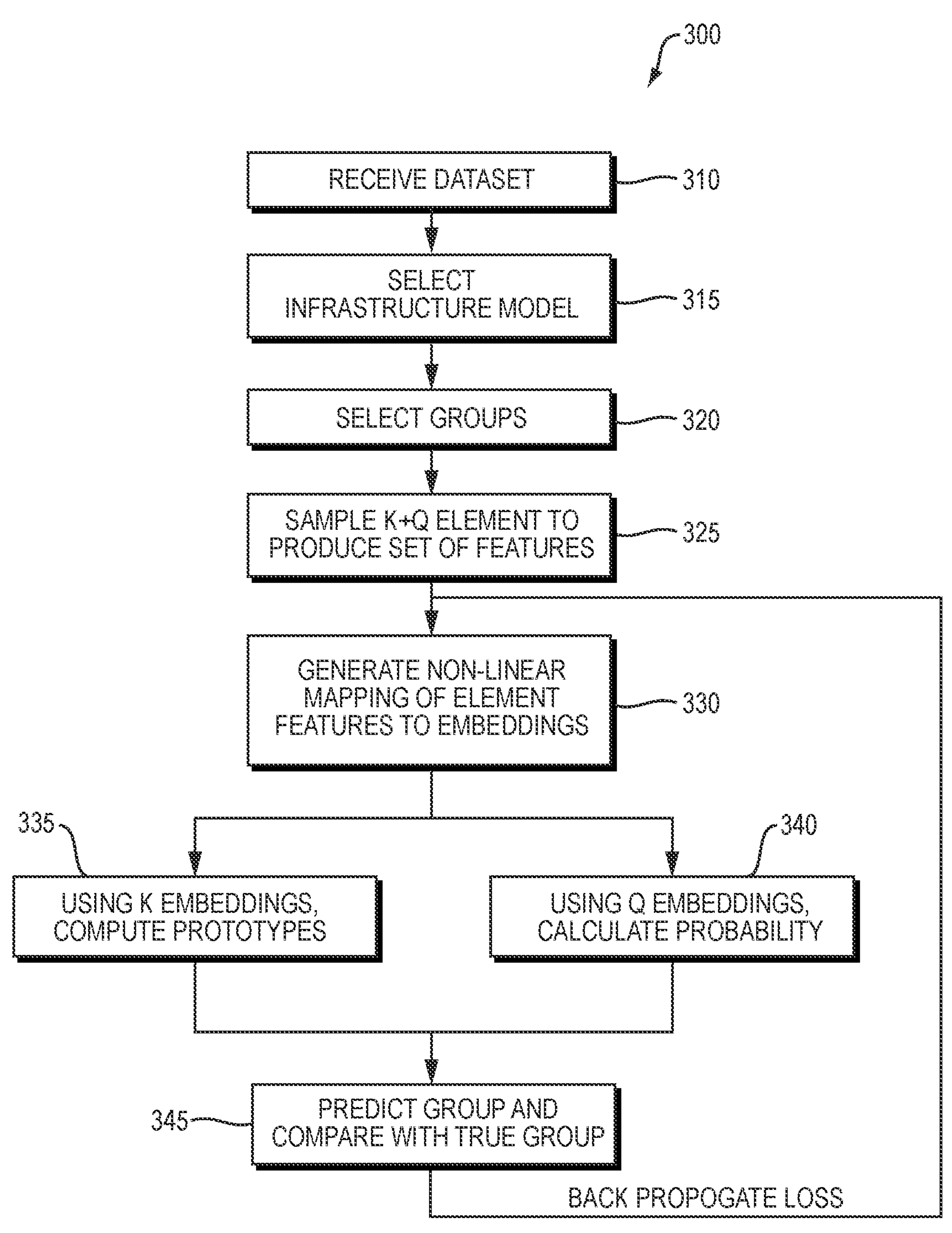
FIG. 3 is a flow diagram of an example sequence of steps for training a neural network ("embedding network"), such as the one shown in FIG. 2, using weakly supervised learning, and for producing prototypes.

FIG. 3 is a flow diagram of an example sequence of steps 300 for training a neural network ("embedding network") 200, such as the one shown in FIG. 2, using weakly supervised learning, and for producing prototypes. The steps 300 may represent a single training step, which may be repeated over and over. The step 300 may be performed by the design validation service 136 or a sub-module thereof. Alternatively, the steps, or some portion thereof, may be performed by other software. FIGS. 5A-5E are diagrams showing an example of operations on a simple infrastructure model 500. In the following discussion, reference may made to FIGS. 5A-5E to more concretely illustrate certain steps.

At step 310, a dataset is received that includes multiple infrastructure models. The models in the dataset do not need to be manually labeled. As set forth below, existing structure of the models may be used as weak labels. The infrastructure models may use different types of nomenclature and include different amounts of class, category and property information. The infrastructure models may be mostly well-classified, with correct classes and categories, and have mostly-correct properties. However, the infrastructure models may include a small percentage of misclassified elements, with incorrect or missing classes and categories, and incorrect or missing properties.

Figure 5A:
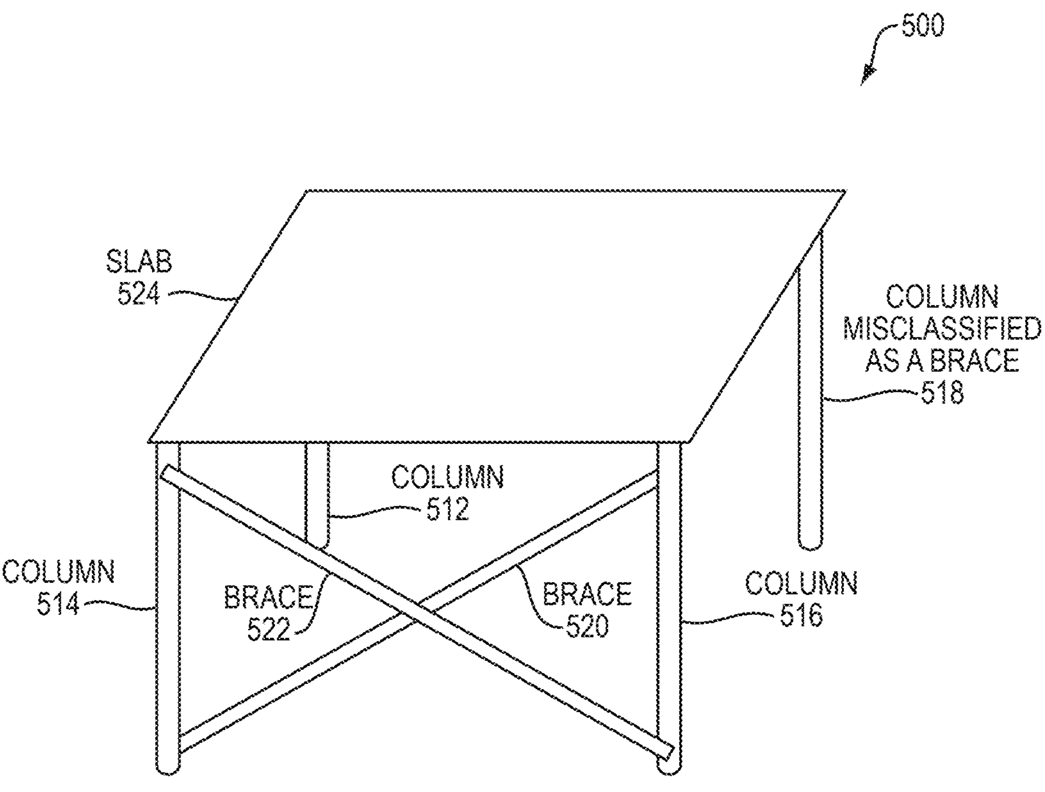
FIGS. 5A-5E are diagrams showing an example of operations on a simple infrastructure model.

At step 315, an infrastructure model is selected. The infrastructure model may include elements that share a common class, category or property, which may be referred to as "groups". Each infrastructure model may be selected with equal probability (e.g., randomly), or the probability may be weighted (e.g., by the number of elements in the infrastructure model, the number of groups or elements in the infrastructure model, etc.). Referring to FIG. 5A, a simple example infrastructure model that may be selected includes seven elements 512-522 that are assigned to three categories: "slab", "column", and "brace". Element 518 may be misclassified, being incorrectly assigned to the "brace" category while it is really a "column."

At step 320, from the selected infrastructure model, groups are selected. The groups may be selected with equal probability (e.g., randomly) or the probability can be weighted (e.g., by the number of elements they contain, the frequency the group appears in the dataset as a whole, etc.). As part of step 320, groups may be merged or collapsed (e.g., if they are very similar). Such merging or collapsing may be based on stemming (e.g., to remove certain numbers or artifacts in text), natural language processing (NLP) models (e.g., to replace abbreviations), tokenizing, or other techniques.

At step 325, for each group, elements (K+Q elements) are sampled (e.g., randomly) with, or without, replacement to produce a set of features (e.g., numeric vectors that describe geometric, textual, contextual, temporal, etc. aspects) of the elements. The set of feature may inhabit k-dimensional space.

Figure 5B:
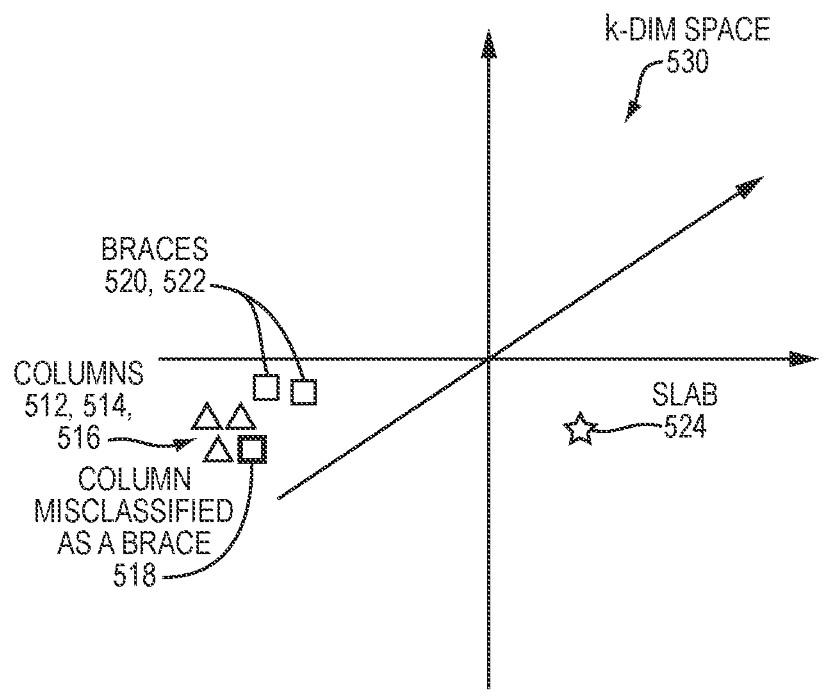

Referring to FIG. 5B, features of the simple example infrastructure model of FIG. 5A may inhabit k-dimensional space 530, where here k=3 for ease of representation. k is typically a relatively large number (e.g., 64). In this example, "column" and "brace" are close together in the k-dimensional space, as they have similar geometry, while differing context.

The set of features of the elements are provided as input to the neural network 200 and, at step 330, the neural network generates a non-linear mapping of element features to embeddings (K+Q embeddings). The embedding inhabit n-dimensional space, where n is typically not equal to k. n is typically a relatively large number (e.g., 128). A goal is to distribute the embeddings in the n-dimensional space so that those corresponding to elements of the same group are close together, while those corresponding to elements of different groups are well-separated, given the class or category classification, or property prediction, task at hand.

Figure 5C:
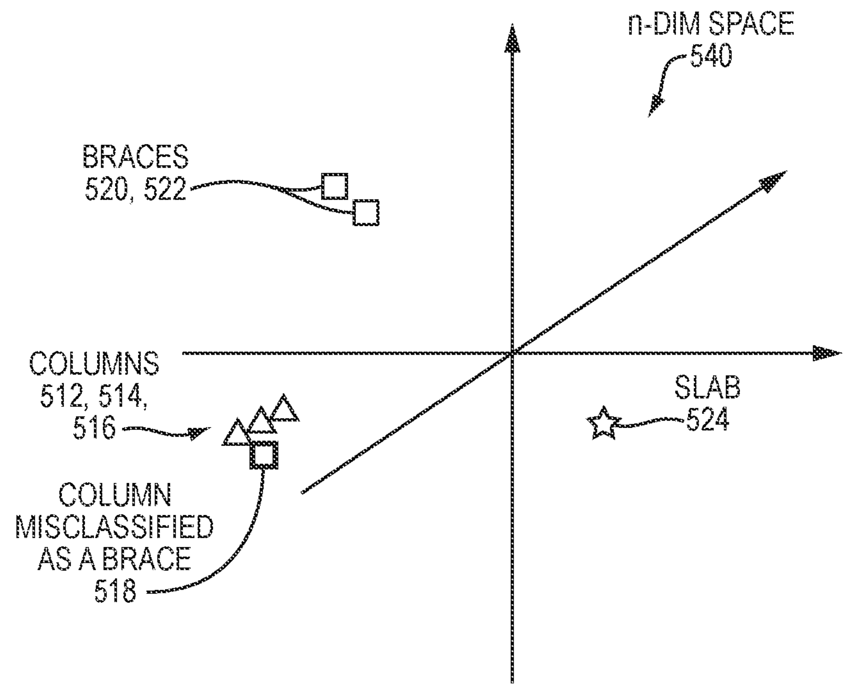

Referring to FIG. 5C, embeddings for the simple example infrastructure model of FIG. 5A may inhabit n-dimensional space 540, where here n=3 for ease of representation. In this example, the embeddings for "column" and those for "brace" are close within the group, but well-separated from embeddings of the other groups. Similarly, the embedding for "slab" is well-separated from those of other groups.

For each group of elements, at step 335, K embeddings are used to compute a prototype. The prototype may be computed by calculating a mean or probabilistic distribution (e.g., a multivariant gaussian distribution) of the group, or a subset of the group. For example, in some implementations, rather than use all K embeddings, a subset of only those confirmed to be correctly classified may be used. Parametrization of the distribution may be obtained by fitting optimal parameters of the elements contained in the group.

Figure 5D:
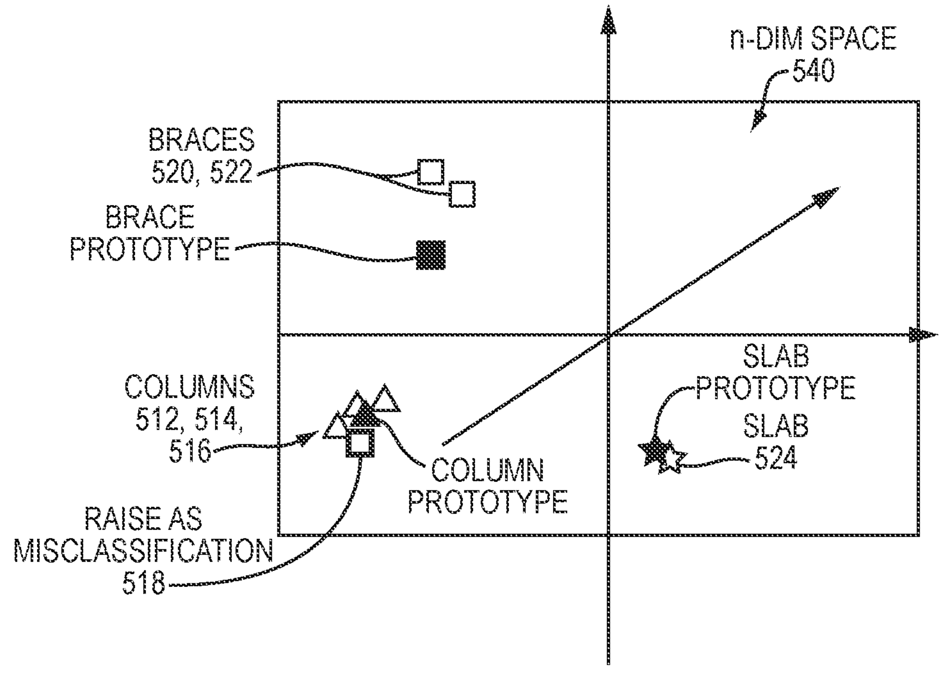

Referring to FIG. 5D, prototypes for the groups "column", "brace" and "slab" are shown for the simple example infrastructure model of FIG. 5A.

At step 340, the remaining Q embeddings are used to calculate a probability of belonging to each group. Probability may be calculated as a distance from the prototype in k-dimensional space. The probability may be transformed into a relative confidence (e.g. using a Softmax function). The highest confidence corresponds to the predicted group.

At step 345, the predicted group is compared to a true group (as indicated in the metadata of the infrastructure model, provided by a user, etc.) to produce a loss (e.g., using a negative log-likelihood (NLL) function). This loss is backpropagated to provide feedback to the neural network 200. By repeating many training steps, such as those provided in steps 300, learning may be achieved.

Over the course of multiple training steps, elements that are outliers may be identified and corrected, enabling the generation of more representative prototypes. An outlier may occur when an element's embedding is a significant distance from its group embedding or from other embeddings in n-dimensional space. Outliers may be detected by comparing relative confidence to a threshold, based on indication from a user, or other techniques. As discussed in more detail below, in some implementations, the indication from a user may be solicited in a user interface that includes a visualization of embeddings. After confirming an element is an outlier, its class, category or property, as the case may be, may be corrected, such that in subsequent training steps more representative prototypes may be generated. Training may continue until the number of outliers falls below a given threshold, or becomes stable.

Figure 5E:
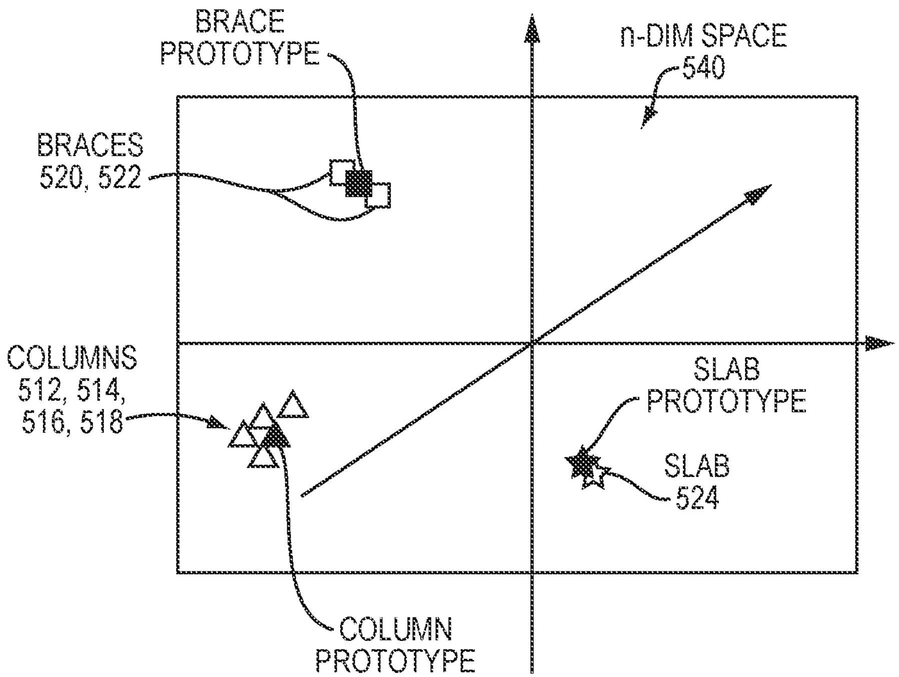

Referring again to FIG. 5D, it may be observed that the "column" misclassified as a "brace" has shifted the prototype for "brace" away from its natural position. Even though the "brace" prototype is shifted, elements often may still be correctly classified. However, classification may be improved by addressing the outlier. Referring to FIG. 5E, after correcting the category of the misclassified element, and generating new prototypes, it may be observed that the prototype for "brace" is now more representative, and thereby will provide better prediction.

Overfitting may be a problem when training neural networks, such as the neural network (embedding network) 200. One example of overfitting is that the neural network learns to embed specific infrastructure models differently than other. A consequence of this overfitting may be that the prototypes created on one infrastructure model fail to generalize to new infrastructure models. Multiple techniques may be used to mitigate overfitting. In one implementation, the loss determined in step 345 may be regularized to constrain the prototypes into similar distributions between different infrastructure models.

Figure 4:
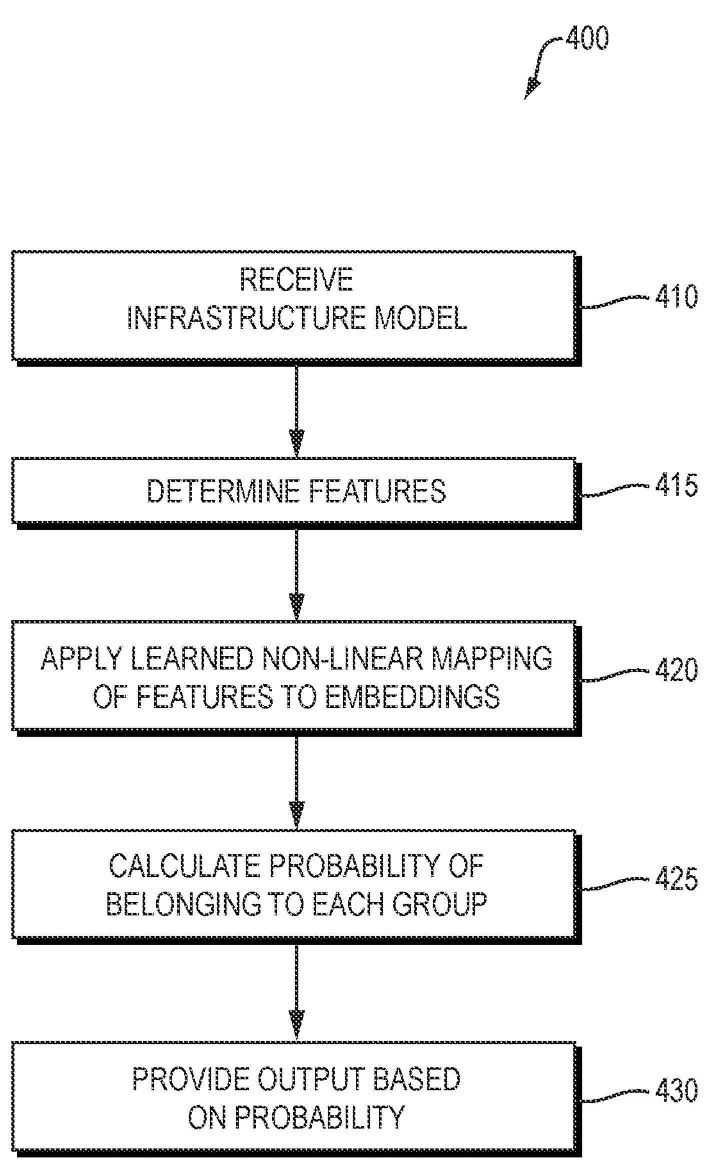
FIG. 4 is a flow diagram of an example sequence of steps for inference that may classify elements in an infrastructure model into classes or categories, or predict properties, as the case may be, using prototypes.

The prototypes may be used to classify elements in an infrastructure model into classes or categories, or be used to predict properties, as the case may be, by finding a nearest prototype. FIG. 4 is a flow diagram of an example sequence of steps 400 for inference that may classify elements in an infrastructure model into classes or categories, or predict properties, as the case may be, using prototypes. The steps 400 may be performed by the design validation service 136 or a sub-module thereof. Alternatively, the steps, or some portion thereof, may be performed by other software, that is deployed locally or in the cloud (which may be independent of the design validation service 136).

At step 410, an infrastructure model is received that includes elements.

At step 415, features (e.g., numeric vectors that describe geometric, textual, hierarchical and contextual, temporal, etc. aspects) are determined for each of the elements.

At step 420, the non-linear mapping of element features to embeddings learned by neural network 200 is applied to the features from step 415 to transforms them into embeddings.

At step 425, for each embedding, a probability of belonging to each group of the plurality of groups learned during training is calculated. Probability may be calculated as a distance from the prototype of the group in k-dimensional space. The probability may be transformed into a relative confidence (e.g., using a Softmax function). The highest confidence may correspond to the predicted group, and thereby indicate a predicted class, category or property for the respective element, as the case may be.

At step 430, an output is provided based on the probability/relative confidence of belonging to one or more of the plurality of groups. The output may be provided by displaying it in a user interface on a display screen, storing to memory/storage, sending to other software, or other manners. The output may include the predicted class, category or property for the respective element, as the case may be. For example, the output may be an indication that the element is likely misclassified (has an incorrect class or category or property) and a suggestion of one or more reclassifications based on the probability/relative confidence of one or more other groups. In some cases, a number or percentage of other groups that are deemed more probable than the current group may be used to filter out false detections of misclassification. In another example, the output may indicate a class, category or property is missing and a suggestion of information to add based on the class, category or property corresponding to the group having the highest probability/relative confidence for that element. As discussed in more detail below, in some implementations the output may include a visualization of embeddings which may convey indications of misclassifications, missing information and other types of information. It should be understood that a wide variety of other outputs may be provided based on the information conveyed by the predicted group and/or relative confidences.

The steps 400 may be used to classify elements and produce various outputs even for groups that have never been seen in training. Elements may be grouped together simply if their embeddings are close together in n-dimensional space, regardless of whether or not these groups have previously been seen. As such, the steps 400 may be used with infrastructure models that include previously unseen metadata, for example, different nomenclature (e.g., a foreign language).

Likewise, the steps 400 may be performed multiple times to classify elements in an infrastructure model along multiple axes (i.e. into multiple classes, categories or to predict multiple properties). For example, the same embedding may allow classification into class (e.g., beam, column, slab, etc.) and predict material (e.g., wood, concrete, steel, etc.).

The design validation service 136 may provide a user interface that includes a visualization of an infrastructure model based on embeddings. As mentioned above, such visualization may be used during the training steps 300 of FIG. 3 (e.g., to solicit indications from a user regarding elements misclassified and labeling with true class, category, or property, as the case may be) and/or during the inference steps 400 of FIG. 4 (e.g., as part of providing an output showing predictions, identifying misclassified elements, labeling with true class, category, or property, selecting certain elements, etc.). Alternatively, such visualization may be produced and used independently, or a part of other process flows, for a variety of different purposes. In one implementation, the visualization may be used to a provide a similar element search function useful for a variety of process flows.

Figure 6:
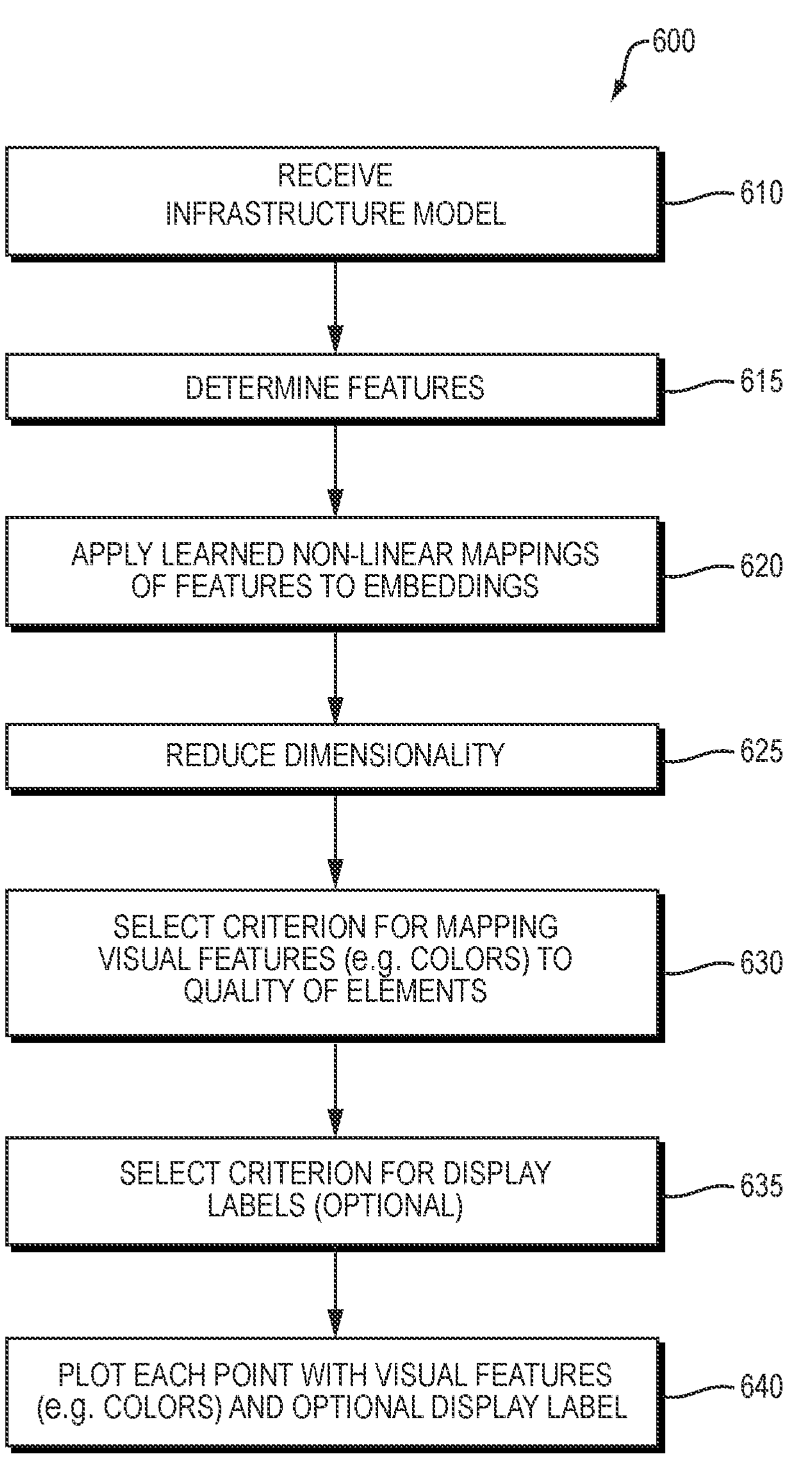
FIG. 6 is a flow diagram of an example sequence of steps for providing a visualization of an infrastructure model based on embeddings.

FIG. 6 is a flow diagram of an example sequence of steps 600 for providing a visualization of an infrastructure model based on embeddings. The steps 600 may be performed by the design validation service 136 or a sub-module thereof. Alternatively, the steps, or some portion thereof, may be performed by other software that is deployed locally or in the cloud (which may be independent of the design validation service 136).

At step 610, an infrastructure model is received that includes elements. At step 615, a set of features (e.g., numeric vectors that describe geometric, textual, hierarchical and contextual, temporal, etc. aspects) is determined for each of the elements. At step 620, the non-linear mapping of element features into embeddings learned by a neural network 200 is applied to each set of features to transform them into embeddings. The embedding may inhabit n-dimensional space. It should be understood that if the embedding-based visualization is being produced as part of training steps 300 or inference steps 400, steps 610-620 may be duplicative of operations performed in such sequences, and need not be separately performed.

At step 625, the dimensionality of the embeddings is reduced from n-dimensions (e.g., 128) to x-dimensions, where $x<n$, yielding a set of points in x-dimensional space that represent elements of the infrastructure model. x may be a number of dimensions more readily represented on a standard display screen. In one implementation x is three or less (e.g., 3, 2). A well-known dimension reduction technique (e.g., a Principal Component Analysis (PCA), t-distributed stochastic neighbor embedding (t-SNE), etc.) may be used.

At step 630, criteria are selected for mapping visually features of points to aspects of elements. In one implementation, the criterion defines a mapping of class, category or property currently associated with the element, or predicted for the element, to colors. The selection of criterion may be automatic (e.g., based on a predetermined scheme) or may be user-chosen (e.g., based on user input in a user interface). By changing the criterion, different classifications, misclassification, predictions, etc. may be examined.

At optional step 635, criteria are selected for determining display labels for each point that represents an element. Such display labels may include full or partial text indicating a currently associated, or predicted, class, category or property. Display labels may be enabled, or disabled (e.g., based on user input in a user interface).

Figure 7:
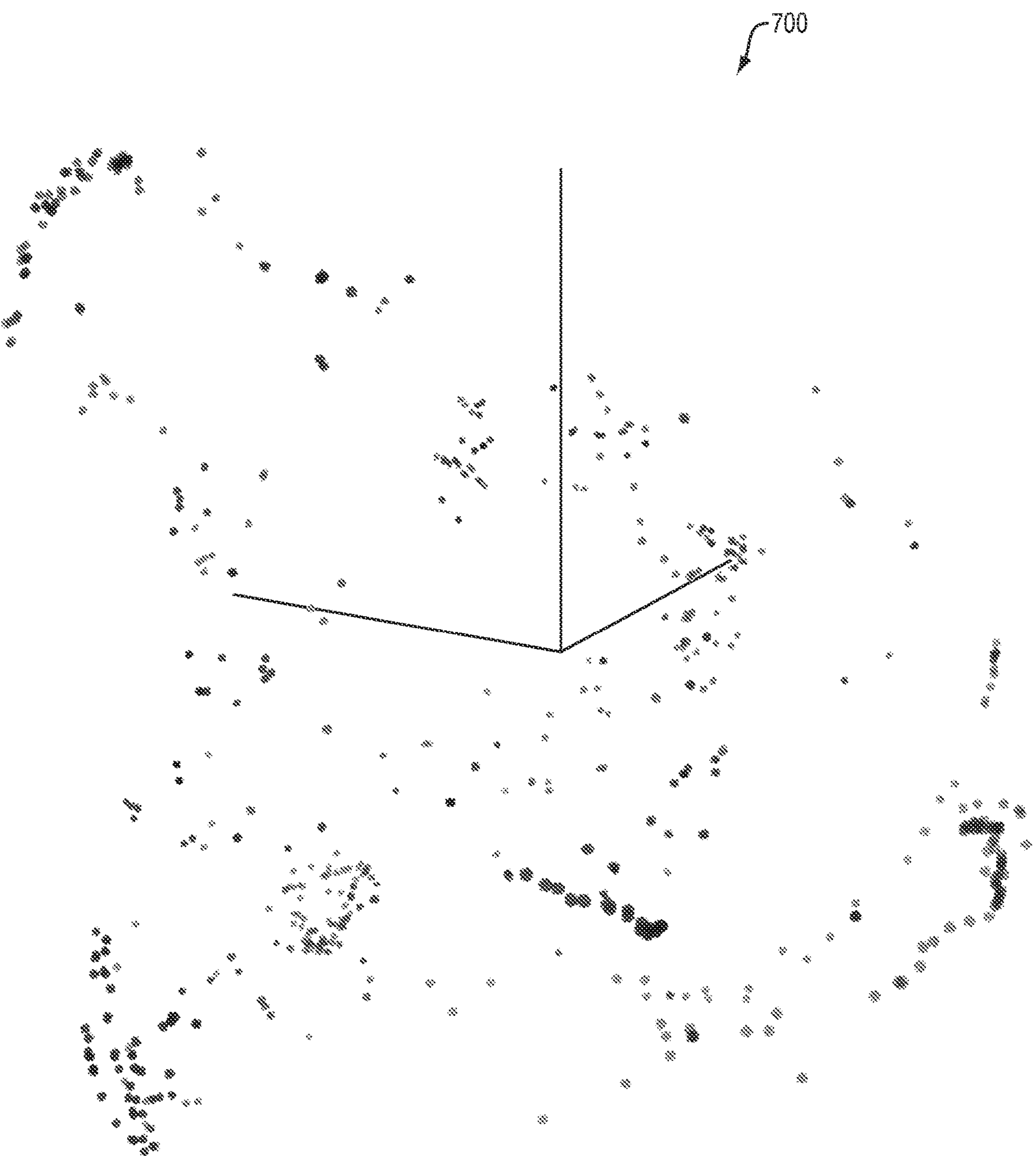
FIG. 7 is an example embedding-based visualization that may be produced for one specific example infrastructure model.

At step 640, each point that represents an element is plotted in x-dimensional space on a display screen, with the selected visual features (e.g., color) and optional display label, producing an embedding-based visualization. FIG. 7 is an example embedding-based visualization 700 that may be produced for one specific example infrastructure model. Points that represent elements that share a similar class, category or property, as the case may be, are displayed nearby to each other. When the visual features (e.g., color) represents the currently associated class, category or property such nearby points should share visual features (e.g., color). A point remote from others having the same visual features (e.g., color) identifies a misclassified element.

By selecting different criterion at step 630, for example, to map different classes, categories or properties to visual features (e.g., colors), misclassifications for some types of information and correctness for other types of information may be observed. For example, an element may be grouped with others of similar color for class, but may not match its neighbors for category. By selecting different criterion at step 630, a user can see the correctness of the class and the incorrectness of the category.

Further, the visual features (e.g., color) of nearby points may indicate the true class, category, or property when there is a misclassification. In one implementation, a user may select a point in the visualization (e.g., by clicking on it). A corresponding element may then be focused on in a separate view (e.g., a 3D view) of the infrastructure model where the user may view its shape in context, class, category, or property information. The user may then label the element with a true class, category, or property based on its geometry or on nearby points in the embedding-based visualization.

Figure 8:
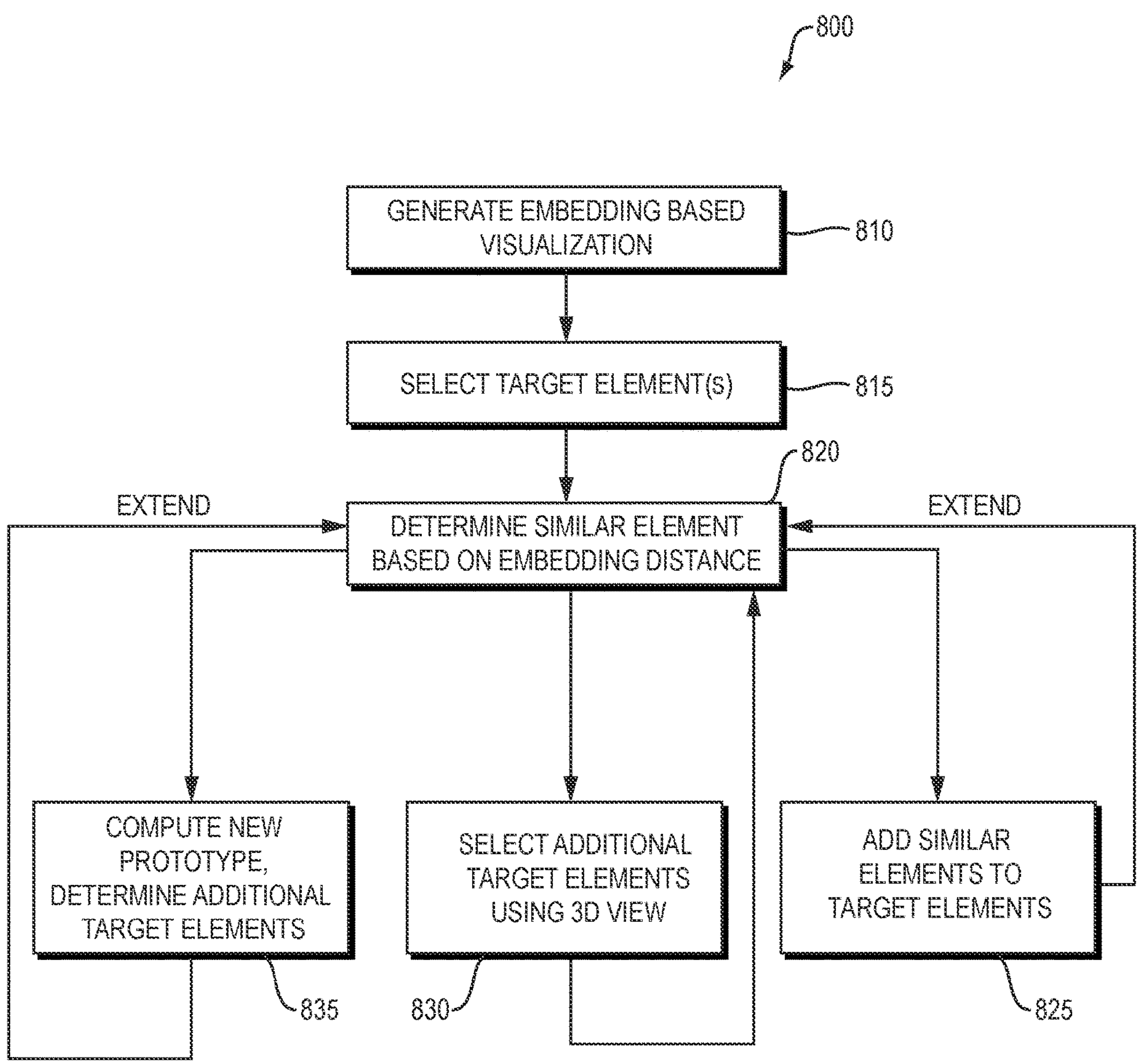
FIG. 8 is a flow diagram of an example sequence of steps for a similar element search function.

Further, the visualization may be used to a provide a similar element search function that may locate elements having similar class, category or properties. FIG. 8 is a flow diagram of an example sequence of steps 800 for a similar element search function. The steps 800 may be performed by the design validation service 136 or a sub-module thereof. Alternatively, the steps, or some portion thereof, may be performed by other software that is deployed locally or in the cloud (which may be independent of the design validation service 136).

At step 810, an embedding-based visualization is generated, for example, using the steps 600 of FIG. 6, for an infrastructure model. At step 815, one or more target elements of the infrastructure model are selected. In one implementation, the one or more target elements are selected by a user selecting (e.g., clicking on) point(s) in an embedding-based visualization displayed in the user interface. In another embodiment, the one or more target elements are selected by a user selecting (e.g., clicking on) elements in a separate view (e.g., a 3D view) of the infrastructure model shown in the user interface.

At step 820, one or more similar elements are determined based on whether their embeddings are nearby in n-dimensional space to those of the target elements. A distance threshold may be used to determine if embeddings are sufficiently close.

At step 825, at least some of the determined similar elements may be added to the target elements to extend the similarity search, and execution looped back to step 820 to determine additional similar elements.

Similarly, step 830, additional target elements may be selected, for example, by a user selecting (e.g., clicking on) point(s) in 3D view of the infrastructure model, and added to the target elements to extend the similarity search, and execution looped back to step 820 to determine additional similar elements.

Still further, at step 835, a new prototype may be computed to extend the similarity search. The new prototype may be computed by calculating a mean or probabilistic distribution (e.g., a multivariant gaussian distribution) of the embeddings of the target elements. One or more additional similar elements may be determined based on whether their embeddings are nearby in n-dimensional space to the new prototype and these added to the target elements. Execution may then loop back to step 820 to determine additional similar elements. The new prototype may be iteratively refined. In some implementations, the new prototype may be retained and used, for example, to produce a new class in the infrastructure model (e.g., to split a generic class into multiple more specific ones).

In summary, techniques are provided to classify elements into classes or categories, or predict properties of elements, in an infrastructure model using a prototype network and weakly supervised learning. It should be understood that a wide variety of adaptations and modifications may be made to the techniques. For example, various fine-tuning techniques may be used to improve training and prediction. Finetuning may be applied to similar or identical elements in an infrastructure model. An infrastructure models often include similar or identical elements (e.g., a row of identical support beams). Because of contextual features, such elements may not end up at the exact same location in the embedding space. In some implementations, the training steps 300 of FIG. 3 may be modified to enforce that elements that have identical geometric or textual features are placed in the same group. This may be used to refine the prototypes created (e.g., by a process of optimization). In other implementations, the inference steps 400 of FIG. 4 may be modified to enforce that elements that have identical geometric or textual features receive the same prediction. Likewise, various types of review may treat together elements that have identical geometric or textual features (e.g., so that a correction is applied all such elements at the same time).

Further, finetuning may be applied across infrastructure models of a dataset. For example, the training steps 300 of FIG. 3 may be modified to overfit a specific infrastructure model, or a group of specific infrastructure models. This may be advantageous when tracking an infrastructure project through its design process, so that information learned in one design iteration is leveraged when new elements are added to an infrastructure model or related infrastructure models of a group in future iterations.

In other implementations, infrastructure models may be known to have significant misclassifications. The training steps 300 of FIG. 3 may be modified to ignore probable misclassifications when generating prototypes, or to correct such misclassifications before generating prototypes. In other implementations, an infrastructure model may have been validated up to a certain changeset and all elements added to the model before that changeset might be considered correctly classified and the prototype creation process might be biased to correctly classify them.

Further, while it is discussed above that property prediction may be used to correct erroneous, or fill in missing, properties which were the subject of training, property prediction may also be used for properties that have not been specifically trained. When faced with a new unknown property for which there is no specifically trained output dimensions, embeddings may still be able to represent the property. For example, a regression model may be built on top of the embeddings using known values for the property, allowing estimation of values of such properties. Outliers may be used to identify misclassifications or missing values predicted.

In addition, while it is described above that an embedding-based visualization may be based on a dimensional reduction of n-dimensional space, the visualization may also be focused on one or more specific dimensions of the embedding space that represent certain features of interest. An interpretable embedding may be added during training to ensure some dimensions represent such features. For example, an embedding that has a dimension that represents height, length, material, etc. may be forced, and such embedding used to restrict a search for similar elements.

Still further, while it is described above that a new prototype may be built based on one or more elements selected by a user (positive examples), prototypes also may be built or adjusted based on negative examples. For instance, a user may select one or more elements they are not interested in. A classifier may be trained on top of embeddings to select elements similar to the positive examples, while simultaneously excluding elements similar to the negative examples.

In general, it should be remembered that functionality may be implemented using different software, hardware and various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A method for reclassifying an element of an infrastructure model that is misclassified or is missing a class, category or property to enable analytics, comprising:

accessing one or more training infrastructure models that include a plurality of elements that model individual portions of infrastructure, wherein infrastructure is a physical structure or object to be built;

during training, for the one or more training infrastructure models, selecting, by software executing on one or more computing devices, a plurality of groups of elements associated with different classes, categories or properties from the training infrastructure models, wherein the selection is with equal probability or weighted;

generating, by a neural network of the software, a non-linear feature-embedding mapping that maps features of elements of the groups of the training infrastructure models to embeddings, wherein the features are derived from metadata describing geometric, contextual or temporal aspects of the portion of infrastructure modeled by the elements, and the embeddings are multi-dimensional numerical representations distributed in multi-dimensional embedding space such that distance between the embeddings is meaningful to a class, category or property of the elements of the infrastructure models, determining, by the software, prototypes for each of the plurality of groups of elements based on the embeddings for the elements of a respective group, wherein a prototype is a single representation in the multi-dimensional embedding space that embeddings of a group cluster around, identifying embeddings learned by the neural network that are outliers from the determined prototypes and correcting the outliers by updating a class, category or property of the elements in the training infrastructure models corresponding to the outliers, and refining, by the software, the non-linear feature-embedding mapping based on the corrected outliers by repeating the selecting, generating, determining prototypes, and identifying embeddings that are outliers and correcting the outliers, until a condition is met; and during inference, for the infrastructure model that includes misclassified elements or elements that are missing classes, categories or properties, determining, by the software, features for an element of the infrastructure model, applying, by the software, the non-linear feature-embedding mapping to the determined features to produce an embedding for the element, predicting, by the software, a class, category or property of the element based on distance in multi-dimensional embedding space between the embedding for the element and one or more prototypes of the infrastructure model, comparing, by the software, the predicted class, category or property of the element based on the distance between the embedding for the element and the one or more prototypes to a currently associated, category or property of the element, providing, by the software, an output that indicates that the element is misclassified or that the element is missing the class, category or property, reclassifying, by the software, the element to the predicted class, category or property, and executing one or more software-based analytical tools on the infrastructure model with the reclassified element to provide a dashboard for monitoring project performance or measuring impact of design changes to the infrastructure.

2. The method of claim 1, wherein the output includes an indication that the element is misclassified, and a suggestion of reclassifications to the predicted class, category or property.

3. The method of claim 1, wherein the output includes an indication the element is missing a class, category or property, and a suggestion of classification to the predicted class, category or property.

4. The method of claim 1, wherein the output includes an embedding-based visualization in which the embedding of the element and embeddings of other elements of the plurality of groups are plotted as points in multi-dimensional embedding space.

5. The method of claim 4, wherein the providing further comprises:

reducing dimensionality of the embeddings to produce a set of points that represent elements;

selecting a mapping of visual features of points to aspects of the elements; and plotting, by the software, the set of points with the selected visual features to produce the embedding-based visualization.

6. The method of claim 4, wherein the visual features include colors, and the embedding-based visualization maps class, category or property to colors, such that points having a common class, category or property share a common color.

7. The method of claim 1, wherein the determined features are represented in k-dimensional space and the multi-dimensional embedding space is n-dimensional space, with n different from k.

8. The method of claim 7, wherein the output includes an embedding-based visualization in which the embedding of the element and embeddings of other elements of the plurality of groups are plotted as points in x-dimensional space, and $x<n$.

9. The method of claim 1, further comprising:

sampling, by the software, training elements from the plurality of groups to produce a training set of features for the training elements;

providing, by the software, the training set of features for the training elements as input to the neural network; and for each of a plurality of elements of the groups, calculating a probability of an embedding for the element belonging to each group based on a distance in multi-dimensional embedding space between the embedding and the prototype for each of the groups, and determining a predicted group from the probability of the element belonging to each group, and determining a loss based on a comparison of the predicted group and a true group, the loss used to provide feedback to the neural network.

10. A method for reclassifying an element of an infrastructure model that is misclassified or is missing a class, category or property, comprising:

training, by software executing on one or more computing devices, a neural network to learn a non-linear feature-embedding mapping that maps features of elements of one or more training infrastructure models to embeddings, wherein the features are derived from metadata describing geometric, contextual or temporal aspects of the portion of infrastructure modeled by the elements, infrastructure is a physical structure or object to be built, and the embeddings are multi- dimensional numerical representations distributed in multi-dimensional embedding space such that distance between the embeddings is meaningful to a class, category or property of the elements of the infrastructure models, wherein the training includes selecting, by the software, a plurality of groups of elements associated with different classes, categories or properties from the training infrastructure models, wherein the selection is with equal probability or weighted, sampling, by the software, elements from the plurality of groups to produce a set of features for the elements, providing, by the software, the set of features for the elements as input to the neural network to generate the non-linear mapping of features to embeddings, for each of the plurality of groups, determining, by the software, using a first subset of the embeddings, a prototype for the group, the prototype being a single representation in the multi-dimensional embedding space that the embeddings of the group cluster around, and determining, by the software, using a second subset of the embeddings, a predicted group for a plurality of elements based on a distance in multi-dimensional embedding space between the embedding for a respective element and the prototypes for each of the plurality of groups, determining, by the software, a loss based on a comparison of the predicted group and a true group for the plurality of elements, the loss used to provide feedback to the neural network, identifying embeddings learned by the neural network that are outliers from the determined prototypes and correcting the outliers by updating a class, category or property of the elements in the training infrastructure models corresponding to the outliers;

repeating the sampling, providing, determining the prototype, determining the predicted group, determining the loss, and the identifying and correcting, over the course of a plurality of training steps to train the neural network; and during inference, for the infrastructure model that includes the element that is misclassified is missing the class, category or property, using the trained neural network to reclassify the element, and executing one or more software-based analytical tools on the infrastructure model with the reclassified element to provide a dashboard for monitoring project performance or measuring impact of design changes to the infrastructure.

11. The method of claim 10, further comprising:

using the trained infrastructure model to produce an embedding-based visualization in which embeddings of elements are plotted as points in multi-dimensional embedding space.

12. A non-transitory computer-readable medium having instructions stored thereon, the instructions when executed on one or more processors of one or more computing devices being operable to:

access one or more training infrastructure models that include a plurality of elements that model individual portions of infrastructure, wherein infrastructure is a physical structure or object to be built;

during training, for one or more training infrastructure models, select a plurality of groups of elements associated with different classes, categories or properties from the training infrastructure models, wherein the selection is with equal probability or weighted;

generate, by a neural network, a non-linear feature-embedding mapping that maps features of elements of the training infrastructure models to embeddings, wherein the features are derived from metadata describing geometric, contextual or temporal aspects of the portion of infrastructure modeled by the elements, and the embeddings are multi-dimensional numerical representations distributed in multi-dimensional embedding space such that distance between the embeddings is meaningful to a class, category or property of the elements of the infrastructure models, determine prototypes for a each of the plurality of groups of elements based on the embeddings for the elements of a respective group learned by the neural network, wherein a prototype is a single representation in the multi-dimensional embedding space that embeddings of a group cluster around, identify embeddings learned by the neural network that are outliers from the determined prototypes and correct the outliers by updating a class, category or property of the elements in the training infrastructure models corresponding to the outliers, refine the non-linear feature-embedding mapping learned by the neural network based on the corrected outliers by repeating the operations to select, generate, determine prototypes, and identify embeddings that are outliers and correct the outliers, until a condition is met; and provide the non-linear feature-embedding mapping for use in reclassify elements of an infrastructure model that are misclassified or are missing a class, category or property.

13. The non-transitory computer-readable medium of claim 12, wherein the instructions are further operable to:

sample training elements from the plurality of groups to produce a training set of features for the training elements;

provide the training set of features for the training elements as input to the neural network; and for each of a plurality of elements of the groups, calculate a probability of an embedding for the element belonging to each group based on a distance in multi-dimensional embedding space between the embedding and the prototype for each of the groups, and determine a predicted group from the probability of the element belonging to each group, and determine a loss based on a comparison of the predicted group and a true group, the loss used to provide feedback to the neural network.

14. The non-transitory computer-readable medium of claim 12, wherein the instructions to provide include instructions operable to:

display an indication that the elements are misclassified or are missing a class, category or property, and a suggestion of classification to a predicted class, category or property.

15. The non-transitory computer-readable medium of claim 12, wherein the instructions to provide include instructions operable to:

display an embedding-based visualization for at least one of the elements that are misclassified or are missing a class, wherein the embedding-based visualization depicts the embedding of the element and embeddings of other elements plotted as points in multi-dimensional embedding space.

16. A computing device comprising:

one or more processors; and one or more memories storing executable instructions for training a neural network to reclassify an element of an infrastructure model that is misclassified or is missing a class, category or property, the instructions when executed operable to train the neural network by:

for one or more training infrastructure models infrastructure models that include a plurality of elements that model individual portions of infrastructure, wherein infrastructure is a physical structure or object to be built, selecting a plurality of groups of elements associated with different classes, categories or properties from the training infrastructure models, wherein the selection is with equal probability or weighted, generating, using the neural network, a non-linear feature-embedding mapping that maps features of elements of the training infrastructure models to embeddings, wherein the features are derived from metadata describing geometric, contextual or temporal aspects of the portion of infrastructure modeled by the elements, and the embeddings are multi-dimensional numerical representations distributed in multi-dimensional embedding space such that distance between the embeddings is meaningful to a class, category or property of the elements of the infrastructure models, determining prototypes for each of the plurality of groups of elements based on the embeddings for the elements of a respective group, wherein a prototype is a single representation in the multi-dimensional embedding space that embeddings of a group cluster around, identifying embeddings that are outliers from the determined prototypes and correcting the outliers by updating a class, category or property of the elements in the training infrastructure models corresponding to the outliers, and refining the non-linear feature-embedding mapping based on the corrected outliers; and providing the non-linear feature-embedding mapping for use in reclassify elements of an infrastructure model that are misclassified or are missing a class, category or property.

17. The computing device of claim 16, wherein the instructions are further operable to train the neural network by:

sampling training elements from the plurality of groups to produce a training set of features for the training elements;

providing the training set of features for the training elements as input to the neural network; and for each of a plurality of elements of the groups, calculating a probability of an embedding for the element belonging to each group based on a distance in multi-dimensional embedding space between the embedding and the prototype for each of the groups, and determining a predicted group from the probability of the element belonging to each group, and determining a loss based on a comparison of the predicted group and a true group, the loss used to provide feedback to the neural network.

* * * * *